United States Patent
Pflueger et al.

(10) Patent No.: US 8,298,409 B2
(45) Date of Patent: Oct. 30, 2012

(54) FILTER ELEMENT ESPECIALLY FOR FILTERING LIQUIDS OR GASES

(75) Inventors: Frank Pflueger, Sachsenheim (DE); Dieter Schreckenberger, Marbach (DE)

(73) Assignee: Mann+Hummel GmbH, Ludwigsburg (DE)

( * ) Notice: Subject to any disclaimer, the term of this patent is extended or adjusted under 35 U.S.C. 154(b) by 546 days.

(21) Appl. No.: 11/838,624

(22) Filed: Aug. 14, 2007

(65) Prior Publication Data

US 2008/0035540 A1 Feb. 14, 2008

(30) Foreign Application Priority Data

Aug. 14, 2006 (DE) .......................... 10 2006 038 100

(51) Int. Cl.
*B01D 27/10* (2006.01)
*B01D 35/14* (2006.01)
(52) U.S. Cl. ........ 210/130; 210/133; 210/232; 210/429; 210/430; 210/440; 210/443; 210/457
(58) Field of Classification Search .................. 210/429, 210/430, 133, 130
See application file for complete search history.

(56) References Cited

U.S. PATENT DOCUMENTS

| | | | |
|---|---|---|---|
| 5,770,054 A * | 6/1998 | Ardes | 210/130 |
| 5,922,196 A * | 7/1999 | Baumann | 210/232 |
| 6,117,312 A * | 9/2000 | Mees et al. | 210/130 |
| 6,579,448 B2 * | 6/2003 | Dworatzek | 210/130 |
| 2003/0226800 A1 * | 12/2003 | Brown et al. | 210/497.01 |
| 2006/0102534 A1 * | 5/2006 | Faria | 210/130 |
| 2006/0261002 A1 * | 11/2006 | Dworatzek et al. | 210/493.1 |

* cited by examiner

*Primary Examiner* — Benjamin Kurtz
(74) *Attorney, Agent, or Firm* — James Hasselbeck

(57) ABSTRACT

A filter element for filtering liquids or gases, having a concentrically arranged filter medium with zigzag pleats. The filter medium is provided with end disks on its axial end faces, each end disk having an inside that is connected to the filter medium and an outside that faces away from the filter medium. At least a first end disk carries a valve element which is situated concentrically inside the filter medium. This valve element includes a valve seat which bulges outward above the plane of the outer side of the end disk. The valve element includes a valve body which cooperates with the valve seat and which is arranged on the first end disk so that it is axially movable and is inside of and surrounded by the filter medium.

14 Claims, 3 Drawing Sheets

FILTER ELEMENT ESPECIALLY FOR FILTERING LIQUIDS OR GASES

BACKGROUND OF THE INVENTION

The present invention relates to a filter element, in particular for filtering liquids or gases, e.g., for filtering oil for an internal combustion engine, having a bypass valve for the fluid to be filtered. Furthermore, the invention relates to a filter device suitable for containing the filter element of the invention, and to a method for maintaining a filter device of the invention.

It is known that in fluid filters having cylindrical filter inserts the bypass valve can be accommodated in the area of an end disk. The bypass valve is provided on the filter element to ensure fluid flow in the case of an unacceptable increase in flow resistance such as a clogged filter. By opening the bypass valve, the supply of fluid or gases to the system is ensured in this case.

A fluid filter with a bypass valve is disclosed, for example, in U.S. Pat. No. 5,770,054 (=DE 196 05 425). FIG. 2 in that document shows a fluid filter in a disassembled state. A supporting dome is provided in the housing, to which is attached a valve body biased by a spring. This valve body finds a valve seat in the end disk belonging to the filter element when the filter element is installed. This provides an inexpensive design of the bypass valve. When the filter element is changed, however, only the valve seat together with the filter element is replaced. The valve body remains in the supporting dome, which is designed to be permanently attached to the housing. Therefore in the course of use of the filter, the valve body is subject to wear and soiling. With modern diesel engines in particular, the valve body may lose its tightness due to deposits of particles, so that an unwanted and unfiltered side stream of the lubricating oil is formed at the bypass valve. This worsens the quality of the lubricating oil, so that either the function of the internal combustion engine is endangered or more frequent oil change intervals are required. To avoid a malfunction, the valve body could also be replaced each time the filter is changed, but this creates increased installation costs and creates possible sources of error because the mechanic might forget to replace the valve body.

SUMMARY OF THE INVENTION

It is an object of the invention to provide an improved filter element especially for filtering a liquid or a gas.

A further object of the invention is to provide an improved filter device which can use the filter element of the invention.

Another object of the invention is to provide a filter element and filter device especially for filtering a liquid or a gas, which are highly reliable.

These and other objects have been achieved in accordance with the present invention by providing a filter element for filtering a liquid or a gas, the filter element comprising a concentrically arranged filter medium folded in zigzag pleats and being provided with end disks at the axial end faces of the filter medium, each end disk having an inner side that is connected to the filter medium and an outer side that faces away from the filter element; wherein at least a first end disk carries a valve element which is arranged concentrically inside the filter medium, the valve element comprising a valve seat which bulges outward above the plane of the outer side of the end disk and a valve body or valve disk which cooperates with the valve seat and which is mounted on the first end disk in an axially movable manner inside and surrounded by the filter medium.

The filter element according to the invention comprises a filter medium, for example, a nonwoven filter web or a paper, that is arranged concentrically and is provided with end disks on it axial end faces, in which one of the end disks carries a valve element which comprises a valve seat and an axially displaceable valve element, the axial movement of which is limited by a guide. In replacing the filter element, this valve is also replaced, so that it is possible to ensure that the filter will function reliably.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
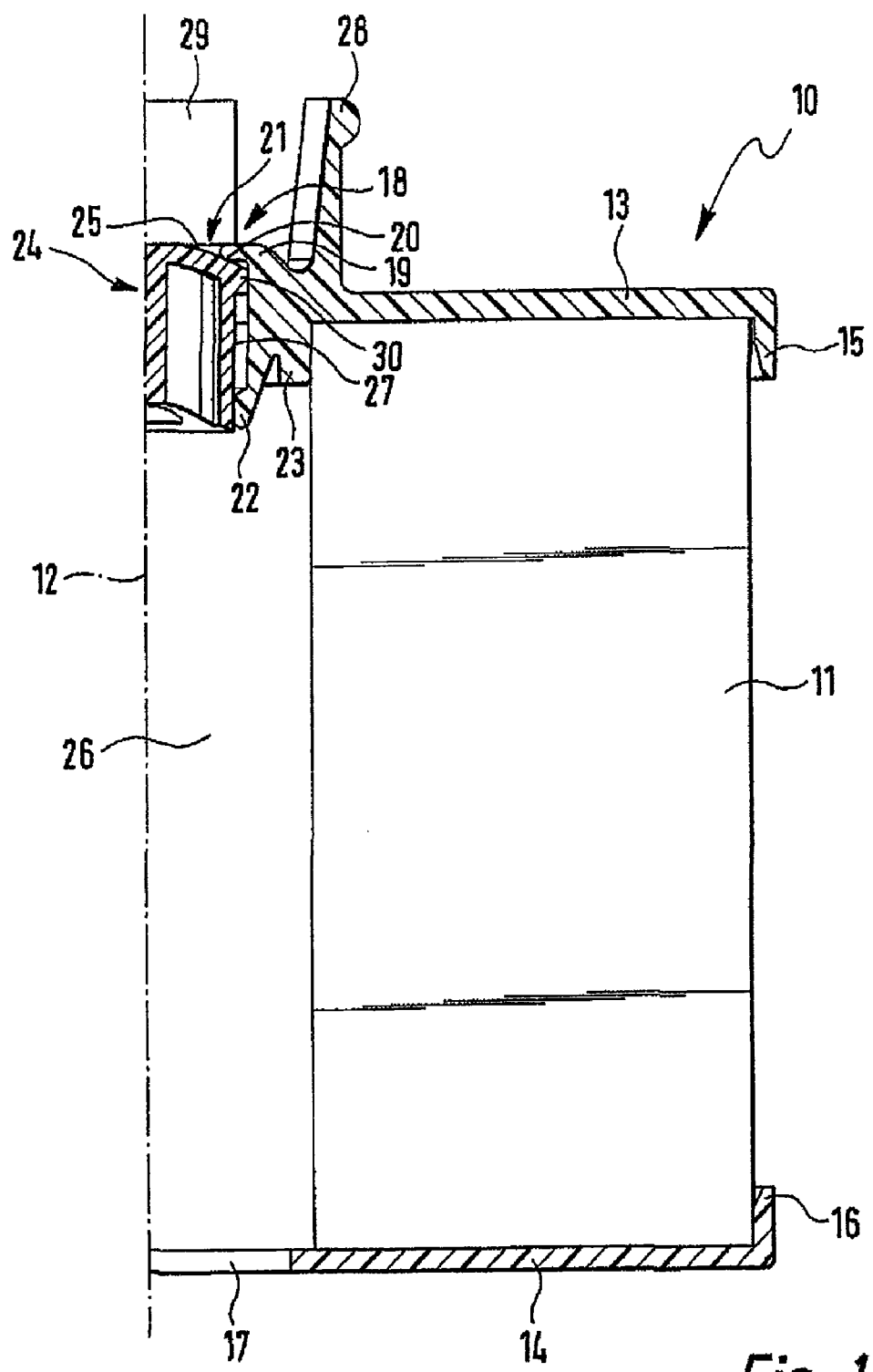
FIG. 1 is a half section of a filter element according to the present invention.

The half-sectional view in FIG. 1 shows a filter element 10 that comprises a filter medium 11 which is folded in zigzag pleats and is arranged concentrically around the central axis 12. The filter medium is bounded at its axial end faces by a first end disk 13 and a second end disk 14. The end disks ensure a tight seal and are secured to the filter medium 11 by adhesive bonding or, if the end disks are thermoplastic end disks and the filter medium is a thermoplastic material, by a welding operation. The end disks each have an outer flange 15, 16 for concentric positioning of the filter medium 11. Whereas the end disk 14 has an essentially flat construction and an opening 17 to accommodate a connection in its inner area, the first end disk 13 is designed as a functional part and serves at the same time as a carrier for a valve 18.

Valve 18 comprises the following components: first the first end disk 13 is provided with a bulge 19. This bulge 19 forms a valve seat 20 in its inner area. Within the valve seat there is a valve opening 21 through which liquid or gas can flow into to filter as long as the valve is open. The valve 18 is also provided with guide webs 22, only one of which can be seen in this Figure. In the area of the guide web 22 a contact pin 23 is provided, as explained in greater detail below.

Inside of the first end disk 13 is a valve body part or sliding valve 24 which is held by the guide webs and is bordered axially at the top by the valve seat 20. This sliding valve 24 has a valve body surface 25 which cooperates with the valve seat 20 and in the position shown here ensures a seal of the interior space 26 within the filter medium 11. The valve body part 24 has a cylindrical surface 27 and can move axially downward. The axial movement of the valve body 24 is guided by the guide webs 22 along the surface 27.

Figure 4:
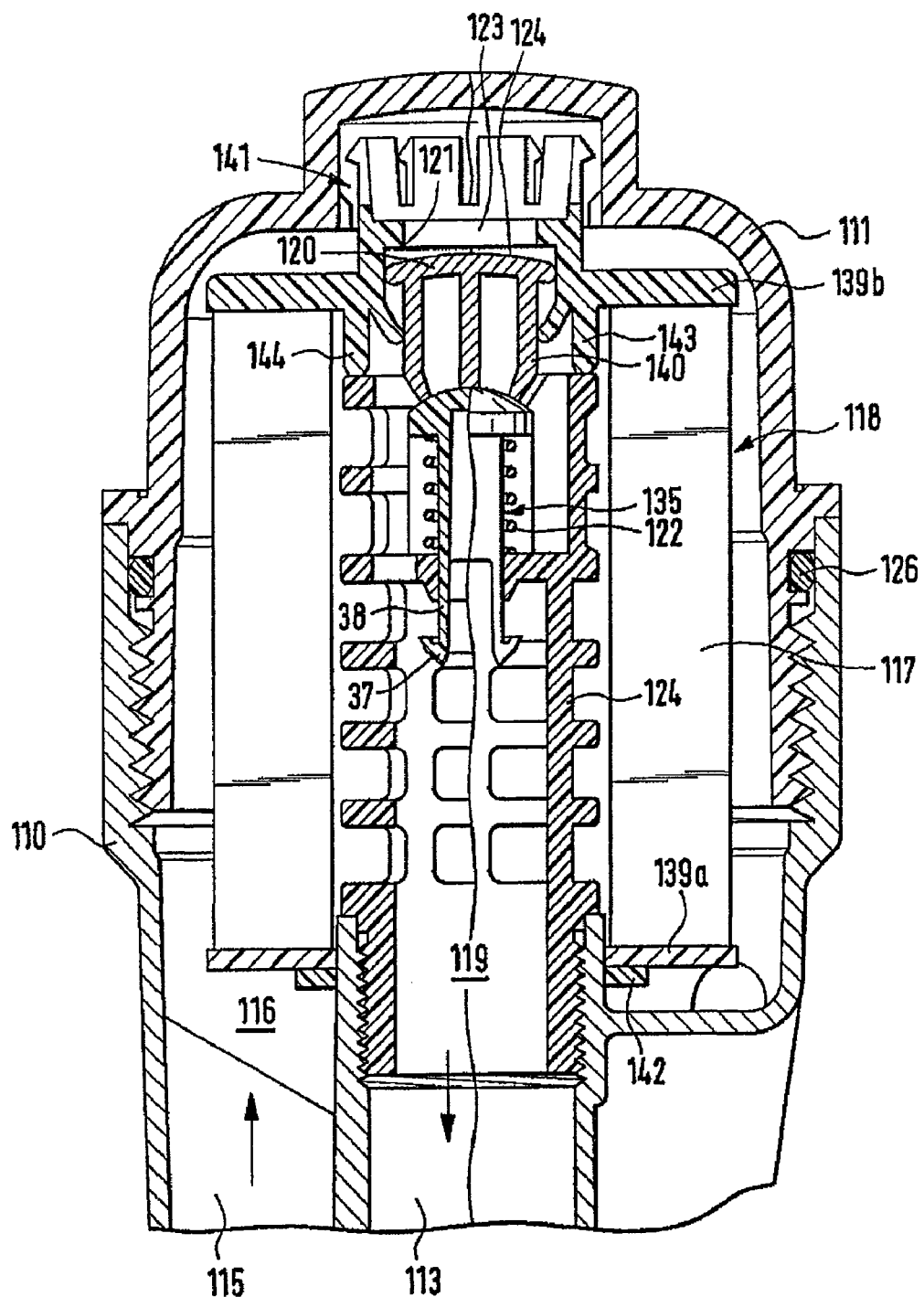
FIG. 4 is shows a sectional diagram of a fluid filter with a filter element according to the invention arranged therein.

The open position of the valve is shown in FIG. 4. Furthermore, snap-in elements 28, 29 are also provided on the first end disk 13 and cooperate with a housing cover, as shown in FIG. 4.

Figure 2:
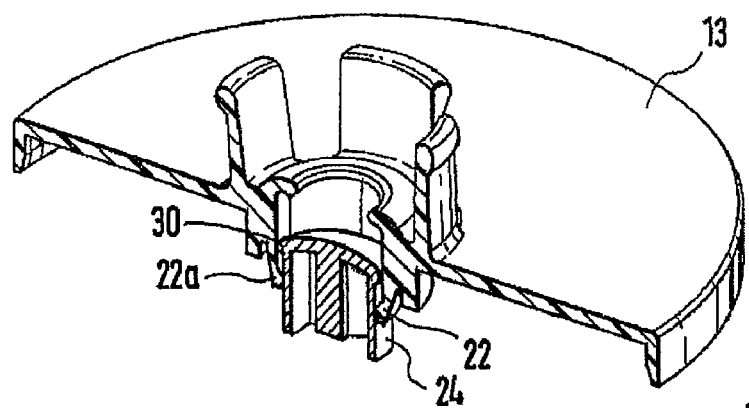
FIG. 2 is a perspective view of a first end disk for the filter element of the invention viewed from above.

FIG. 2 shows a perspective view of the first end disk 13 without the filter medium 11. Corresponding parts are identified by the same reference numerals. The valve body part 24 is shown in the axially lower end position, so the valve is opened. It can be seen here that the guide webs 22 and 22a are opposite one another and other guide webs are provided, offset by 90.degree. in relation to the guide webs shown here, so the valve body part 24 is reliably guided. A supporting edge 30 is provided in the area of the valve body surface and also ensures that the valve body part 24 is supported. As shown in FIG. 1, the sliding valve or valve body part 24 has an axially extending outer cylindrical surface 27. As shown in FIG. 2 with further reference to FIG. 1, the axially extending outer cylindrical surface 27 of the valve body part 24 is without gaps or grooves, (i.e. a circumferentially continuous cylindrical surface 27, also see FIG. 1).

Figure 3:
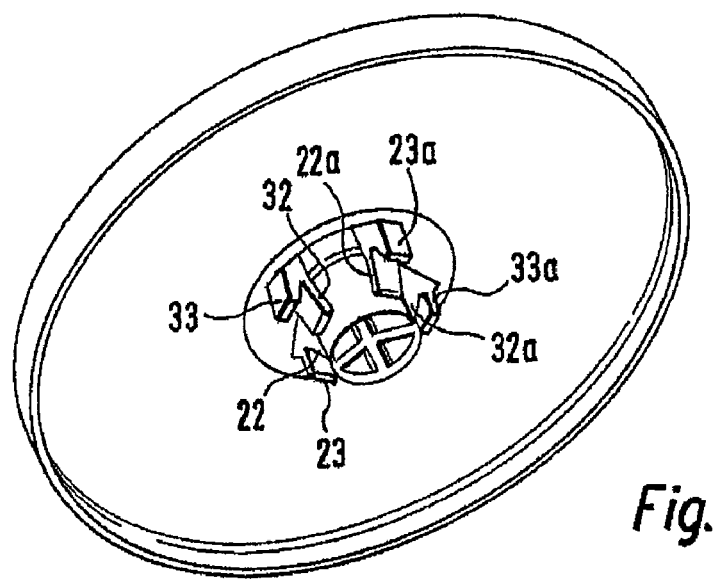
FIG. 3 is a perspective view of the end disk of FIG. 2 viewed from below.

FIG. 3 shows the guide webs 22, 22*a* and 32, 32*a*. Furthermore, this drawing figure shows the contact pins 23, 23*a*, 33, 33*a* that are arranged in the area of the guide webs and whose mechanism of action is described in greater detail below. The end disk 13 and the valve body part 24 are both made of a thermoplastic synthetic resin material. The valve body part 24 is simply engaged in the end disk at the time of assembly. As shown in FIG. 3, the guide webs 22, 22*a* and 32, 32*a* are formed by a radially inwardly leg and the respective contact pins 23, 23*a*, 33, 33*a* are formed by a radially outwardly leg of the a plurality of V-shaped members (for example V-shaped member having legs 22*a*+23*a*). As shown in FIG. 3, the V-shaped members are secured to said inner side of said first end disk (13) and spaced apart radially around the exterior of the axially extending outer cylindrical surface 27 of the sliding valve or valve body part 24 (see also FIGS. 1 and 2).

The fluid filter shown in FIG. 4 contains a filter element like that shown in FIG. 1 and is explained in greater detail below. First, a base 110 is provided as well as a screw-on cover 111. In the area of the base there is an outlet 113 and an inlet 115. The fluid to be filtered flows through the inlet 115 into a raw or unfiltered fluid side 116 of the filter, passing from there through the filter medium 117 of a filter insert 118, and then going into an interior space 119 of the filter insert, which represents the clean side of the filter. The filtered fluid then flows out of the filter through the outlet 113.

When a certain pressure difference on the filter element is exceeded, a bypass valve, which comprises a valve body 120 and a valve seat 121 opens so that the fluid flows through the bypass openings 123 and thus passes directly from the raw fluid side 116 to the interior space 119 of the filter insert 118. In the illustrated embodiment, the end of the valve body 120 which faces away from the valve seat 121 engages an axially moveable intermediate member 135 which is mounted on the support tube or support dome 124 fixedly mounted in the base 110. A spring 122 mounted in the support tube 124 urges the intermediate member axially upwardly and thus presses the valve body 120 against the valve seat 121. Retainers 38 with catches 37 on the intermediate member 135 limit the axial movement of the intermediate member 135 and prevent it from disengaging from the support tube 124.

The centrally disposed support tube 124 also serves to support the filter medium 117. During installation, the filter insert 118, into which the valve body 120 and the valve seat 121 are integrated, can be pushed onto this supporting dome. Then the screw-on cover 111 is screwed into the base 110. A seal is achieved by a molded gasket 126 between the base and the screw-on cover.

The compression spring 122 exerts an axially directed closing force through the intermediate member 135 on the ribs 140 of the valve body 120 and normally holds the valve closed. In this figure, however, the valve body 120 is shown in the position in which its valve body surface 124 is spaced a distance from the valve seat 121. Thus, as depicted in FIG. 2, fluid can pass between the holding webs 22 from the raw fluid side to the clean fluid side. This open position of the valve body surface 124 is assumed only when the fluid pressure on the raw fluid side is significantly above the fluid pressure on the clean fluid side.

The filter insert 118 is sealed at the end faces with end disks 139*a*, 139*b*. A radial gasket 142 that is provided on the end disk 139*a* ensures a seal in this area between the raw fluid side and the clean fluid side. A snap-in connection 141 is provided on the end disk 139*b* for securing the filter insert 118 in the screw-on cover 111 when the filter is screwed on.

Furthermore, contact pins 143, 144 are arranged on the end disk 139*b* and are engaged with the supporting dome 124 or functional elements on the supporting dome 124. Thus through these contact pins the supporting dome or parts of the supporting dome are held in a predefined axial position. Furthermore these contact pins may actuate functional components on the supporting dome such as locking systems. The crucial function of these contact pins is that they achieve a functionally reliable cooperation between the supporting dome 124, the filter insert 118, the screw-on cover 111 and the base 110.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for filtering a liquid or a gas, said filter element comprising a concentrically arranged filter medium folded in zigzag pleats and being provided with end disks at the axial end faces of the filter medium, each end disk having an inner side that is secured to the filter medium and an outer side that faces away from the filter element;

wherein at least a first end disk carries a valve element which is arranged concentrically inside the filter medium, said valve element comprising a valve seat formed in the first end disk; and a valve body mounted on the first end disk in an axially movable manner inside and surrounded by the filter medium, said valve body including a valve body sealing member having a sealing surface which closes against the valve seat;

an axially extending circumferentially continuous closed cylindrical or conical valve body surface without gaps or grooves, said valve body surface having a first end secured to an inner side of said valve body sealing member and extending inwardly away from said valve body sealing member into an interior of said filter element;

a plurality of V-shaped members secured to said inner side of said first end disk and spaced apart radially around an exterior of said axially extending circumferentially closed valve body surface, said V-shaped members including a radially inwardly arranged leg forming resilient guide webs, each guide web contacting said circumferentially closed valve body surface, guiding axial movement of said valve body in said first in disk;

a radially outwardly arranged leg forming contact pins extending axially into an interior of said filter element and toward the other end disk of said filter element, said contact pins configured to interact with a filter support tube of a housing into which said filter element installs.

2. A filter element according to claim 1, further comprising resilient guide webs extending from an inside surface of the first end disk for guiding movement of the valve body.

3. A filter element according to claim 2, wherein at least three guide webs are provided.

4. A filter element according to claim 2, wherein
said guide webs slideably contact said circumferentially closed cylindrical or conical valve body surface guiding movement of said valve body in said end disk.

5. A filter element according to claim 1, wherein one end disk is provided with snap-in protrusions on an outside surface thereof for connecting the filter element to an additional component.

6. A filter element according to claim 1, wherein said filter element is essentially metal-free.

7. A filter element according to claim 2, wherein said guide webs form a stop for limiting axial movement of the valve body.

8. A filter element according to claim 7, wherein said stop comprises inwardly facing protrusions on the guide webs which engage an annular bead on the valve body.

9. A filter element according to claim 1, wherein the valve body and the end disks are made of an elastomer.

10. A filter device comprising
a housing with an inlet opening for fluid to be filtered and a discharge opening for filtered fluid,
a central support tube mounted in said housing for receiving a filter element, and
a filter element according to claim 1 mounted on said central tube in said housing.

11. A method of maintaining a filter device according to claim 9, said method comprising:
removing the cover of the housing is removed;
separating the filter element from the central tube with the valve body remaining on the filter element in contact with the valve seat;
pushing a new filter element onto the support tube such that the side of the valve body facing away from the valve seat engages a spring biased member on the support tube which pushes the valve body toward the valve seat, and contact pins on the filter element engage contact surfaces on the support tube; and
replacing the housing cover.

12. A filter device according to claim 10, wherein
said valve body of said filter element engages against an axially moveable intermediate member arranged in a filter support tube of said housing, said intermediate member acted upon by a spring urging said intermediate member to press said valve body against said valve seat.

13. A filter element according to claim 1, wherein
said first end disk includes an outwards directed bulge above the plane of the outer side of said first end disk, an inward facing portion of said end disk bulge forming said valve seat, said valve seat mating against said valve body;
wherein said valve seat is positioned outwards above the plane of the outer side of the first end disk.

14. The filter element according to claim 1, wherein
said contact pins engage said filter support tube of said housing into which said filter element installs, said support pins holding a pre-defined axial position of said first end disk relative to said support tube.

* * * * *